US012021557B2

(12) United States Patent
Liu et al.

(10) Patent No.: US 12,021,557 B2
(45) Date of Patent: Jun. 25, 2024

(54) IMPULSE GENERATION METHOD AND IMPULSE-RADIO TRANSMITTER

(71) Applicant: Stichting IMEC Nederland, Eindhoven (NL)

(72) Inventors: Yao-Hong Liu, Eindhoven (NL); Minyoung Song, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 30 days.

(21) Appl. No.: 18/160,474

(22) Filed: Jan. 27, 2023

(65) Prior Publication Data
US 2023/0268955 A1 Aug. 24, 2023

(30) Foreign Application Priority Data
Feb. 18, 2022 (EP) .................................... 22157385

(51) Int. Cl.
*H04B 1/7163* (2011.01)
*H04B 1/7176* (2011.01)

(52) U.S. Cl.
CPC ................................ *H04B 1/7176* (2013.01)

(58) Field of Classification Search
CPC .. H04B 1/71637; H04B 1/7176; H04B 1/719; H04B 1/7183; H04B 1/7172; H04B 1/71632; H04B 1/7163; H04B 1/71635; H04L 27/0004; H04L 25/4902; H04L 27/02; H04L 27/2647; H04L 27/04; H04L 25/03866; H04L 27/2042; H04L 27/2082; H04W 36/14; H04W 4/80; H04W 76/12; H04W 84/12; H04W 88/08; H04W 92/10;
(Continued)

(56) References Cited

U.S. PATENT DOCUMENTS 7,145,961 B2 12/2006 Carbonari
2004/0257167 A1 12/2004 Kim et al.
(Continued)

OTHER PUBLICATIONS

Extended European Search Report dated Aug. 17, 2022 in European Application No. 22157385.0.
(Continued)

*Primary Examiner* — Eva Y Puente
(74) *Attorney, Agent, or Firm* — Knobbe Martens Olson & Bear LLP

(57) ABSTRACT

A method of generating an impulse for impulse radio transmission signals and an impulse-radio ultra-wideband transmitter are provided. In one aspect, the method includes distributing input digital data according to time information data and amplitude information data along a first modulation path and a second modulation path, respectively. Pulse position modulation is performed based on the time information data along the first modulation path to define a timing position of the impulse. Pulse amplitude modulation is performed based on the amplitude information data along the second modulation path to define an envelope of the impulse. The input digital data can be distributed according to phase information data along a third modulation path, and phase shift keying modulation can be performed based on the phase information data along the third modulation path to define a phase of a carrier signal of the impulse.

20 Claims, 9 Drawing Sheets

(58) Field of Classification Search
CPC .. H04W 12/06; H04W 36/142; H04W 52/225
USPC ......................................................... 375/140
See application file for complete search history.

(56) References Cited

U.S. PATENT DOCUMENTS

| | | | | |
|---|---|---|---|---|
| 2005/0276310 | A1* | 12/2005 | Choi | H04B 1/7176 375/130 |
| 2006/0291536 | A1* | 12/2006 | Santhoff | H04B 1/71632 375/130 |
| 2007/0089022 | A1 | 4/2007 | McLaughlin | |
| 2008/0291973 | A1 | 11/2008 | Azakkour et al. | |
| 2009/0091400 | A1 | 4/2009 | Orlik et al. | |
| 2009/0110108 | A1* | 4/2009 | Kennedy | H04B 1/71635 375/295 |
| 2010/0238914 | A1* | 9/2010 | Feher | H04L 27/2601 370/342 |
| 2010/0309958 | A1* | 12/2010 | Lakkis | H04J 13/0003 375/150 |
| 2019/0207790 | A1* | 7/2019 | Jang | H04L 25/4902 |

OTHER PUBLICATIONS

Cavallaro et al., "A 3-5-GHz UWB Front-End for Low-Data Rate WPANs in 90-nm CMOS", *IEEE Transactions on Microwave Theory and Techniques*, vol. 58, No. 4, Apr. 2010, pp. 854-865.

Demirkan et al., "A 1.8Gpulses/s UWB Transmitter in 90nm CMOS", *2008 IEEE International Solid-State Circuits Conference—Digest of Technical Papers*, Feb. 2008, 3 pages.

Demirkan et al., "A Pulse-Based Ultra-Wideband Transmitter in 90-nm CMOS for WPANs", *IEEE Journal of Solid-State Circuits*, vol. 43, No. 12, Dec. 2008, pp. 2820-2828.

Li et al., "A Dual-Carrier IR-Based UWB Transmitter with Improved Spectral Efficiency", *2009 International Conference on Communications, Circuits and Systems*, Jul. 2009, pp. 788-792, doi: 10.1109/ICCCAS.2009.5250405.

Singh et al., "An IR-UWB IEEE 802.15.4z Compatible Coherent Asynchronous Polar Transmitter in 28-nm CMOS", *IEEE Journal of Solid-State Circuits*, vol. 56, No. 12, Dec. 2021, pp. 3799-3810.

Smaïni et al., "Single-Chip CMOS Pulse Generator for UWB Systems", *IEEE Journal of Solid-State Circuits*, vol. 41, No. 7, Jul. 2006, pp. 1551-1561.

* cited by examiner

IMPULSE GENERATION METHOD AND IMPULSE-RADIO TRANSMITTER

CROSS-REFERENCE TO RELATED APPLICATIONS

This application claims foreign priority to European Application No. 22157385.0, filed Feb. 18, 2022, the content of which is incorporated by reference herein in its entirety.

BACKGROUND

Technological Field

The disclosed technology relates to an impulse signal generation scheme and an impulse radio transmitter, especially an impulse-radio ultra-wideband (IR-UWB) transmitter.

Description of the Related Technology

Generally, conventional IR-UWB transmitters perform impulse modulation with either carrier-less or up-conversion approaches. The carrier-less transmitters use edge-combining functions which leverage the fast-switching digital logic in nanoscale complementary metal-oxide-semiconductor (CMOS), and thus may be power-efficient and require no dedicated local oscillator (LO). Its carrier frequency may heavily depend on the delay generation, requiring an extra calibration to ensure carrier stability. Simultaneously performing multi-level pulse position modulation (M-PPM) and multi-level phase shift keying (M-PSK) in carrier-less transmitters is also challenging, since both phase and time need to be modulated via delay edges.

The classical IQ-based up-conversion method can perform high order modulation, but its high power consumption due to the up-conversion chains (for example, I/Q-mixers) is a limiting factor in achieving high energy efficiency. The polar-based up-conversion transmitter achieves low power consumption, as the pulse shaping is performed asynchronously with delay cells and digitally-controlled PA (DPA). However, it may be limited to supporting binary phase shift keying (BPSK).

For example, the U.S. Application Publication No. 2009/0091400 discloses a method and an apparatus for generating dynamically varying time hopping sequences for UWB signals.

SUMMARY OF CERTAIN INVENTIVE ASPECTS

Accordingly, an object of the disclosed technology is to provide methods and IR-UWB transmitters that can address the aforementioned limitations. This object and others are achieved according to one or more aspects of the disclosed technology.

According to a first aspect of the disclosed technology, a method is provided for generating an impulse for impulse radio transmission signals. The method includes the step of distributing input digital data or bit-stream according to time information data or bits and amplitude information data or bits along a first modulation path and a second modulation path, respectively. The method further includes the step of performing pulse position modulation based on the time information data along the first modulation path to define a timing position of the impulse.

The method further includes the step of performing pulse amplitude modulation based on the amplitude information data along the second modulation path to define an envelope of the impulse. Advantageously, a hybrid impulse modulation technique is provided to combine M-PPM with multi-level pulse amplitude modulation (M-PAM) that significantly improves the available data rate for a given modulation order or bits per symbol.

Advantageously, the method further includes the steps of distributing the input digital data according to at least one additional phase information data or bits along at least a third modulation path, and performing phase shift keying modulation based on the phase information data along the third modulation path to define a phase of carrier signal of the impulse. Therefore, an alternative hybrid impulse modulation technique is provided to combine M-PPM, M-PAM, and M-PSK that significantly improves the available data rate for a given modulation order or bits per symbol.

In some aspects of the disclosed technology, at least one of the pulse position modulation, pulse amplitude modulation, and phase shift keying modulation has a modulation order higher than binary, that is, at least 2 bits per symbol or a modulation order of at least 4. Alternatively, each of the pulse position modulation, pulse amplitude modulation, and phase shift keying modulation has a modulation order higher than binary, that is, at least 2 bits per symbol or a modulation order of at least 4. Advantageously, higher-order modulations, especially higher-order PPM, PAM, and PSK modulations, are incorporated.

In some aspects of the disclosed technology, the method further includes the step of performing pulse position modulation and pulse amplitude modulation jointly within one impulse symbol period. Advantageously, the generated impulse may convey information either in its position in time or in its envelope (amplitude), or both.

Alternatively, the method can include the step of performing pulse position modulation, pulse amplitude modulation, and phase shift keying modulation jointly within one impulse symbol period. Advantageously, the generated impulse may convey information either in its position in time, in its envelope (amplitude), in its phase (carrier), or a combination thereof.

In some aspects of the disclosed technology, the method further includes the step of performing pulse position modulation and pulse amplitude modulation simultaneously within one impulse symbol period. Advantageously, the generated impulse may convey information either in its position in time or in its envelope (amplitude), or both.

Alternatively, the method can include the step of performing pulse position modulation, pulse amplitude modulation, and phase shift keying modulation simultaneously within one impulse symbol period. Advantageously, the generated impulse may convey information either in its position in time, in its envelope (amplitude), in its phase (carrier), or a combination thereof.

It is also to be understood that the pulse position modulation, pulse amplitude modulation, and optionally the phase shift keying modulation may be performed simultaneously together within one impulse symbol period.

In some aspects of the disclosed technology, the method further includes the step of distributing the input digital data along the first modulation path and the second modulation path after being synchronized with a system clock. Alternatively, the method includes the step of distributing the input digital data along the first modulation path, the second modulation path, and the third modulation path after being synchronized with a system clock. Advantageously, the different information data or bits are aligned in time so as to perform the respective modulations within a given symbol period.

In some aspects of the disclosed technology, the method further includes the steps of generating a unit pulse from the system clock to trigger the beginning of an impulse symbol, modulating a delay of the unit pulse based on the time information data, and setting the phase of carrier signal at the beginning of the impulse symbol based on the phase information data. Advantageously, inter-modulation between PPM and PSK is avoided by setting the carrier phase at the beginning of each impulse symbol.

In some aspects of the disclosed technology, the method further includes the step of defining a duty cycle for the unit pulse based on the time information data. Advantageously, by setting the duty cycle based on PPM data and further by modulating the delay of the unit pulse based on the PPM data, a precise order for the PPM can be achieved.

In this regard, the method may include the step of generating the carrier signal with a frequency higher than a frequency of the system clock. Advantageously, the carrier generation scheme, especially together with the ease of modulating the delay of the unit pulse, allows controlling the pulse position with much finer steps. This results in a high modulation order for the PPM (for example, pulse position control in the picoseconds scale).

In some aspects of the disclosed technology, the impulse is an ultra wide bandwidth impulse signal. Therefore, ultra-wideband (UWB) technologies are advantageously facilitated for the proposed impulse generation.

According to a second aspect of the disclosed technology, an impulse-radio ultra-wideband transmitter is provided. The transmitter includes a data distributor, a first modulation path, and a second modulation path. In this regard, the data distributor is configured to distribute input digital data according to time information data and amplitude information data along the first modulation path and the second modulation path, respectively.

In addition, the first modulation path includes a pulse position modulator configured to perform pulse position modulation based on the time information data to define a timing position of an impulse. Furthermore, the second modulation path includes a pulse amplitude modulator configured to perform pulse amplitude modulation based on the amplitude information data to define an envelope of the impulse.

In some aspects of the disclosed technology, the transmitter includes at least a third modulation path. In this regard, the data distributor is configured to distribute the input digital data according to at least one additional phase information data along the third modulation path. Moreover, the third modulation path includes a phase shift keying modulator configured to perform phase shift keying modulation based on the phase information data to define a phase of carrier signal of the impulse.

In some aspects of the disclosed technology, at least one of the pulse position modulation, pulse amplitude modulation, and phase shift keying modulation has a modulation order higher than binary. Alternatively, each of the pulse position modulation, pulse amplitude modulation, and phase shift keying modulation has a modulation order higher than binary.

In some aspects of the disclosed technology, the pulse position modulator and the pulse amplitude modulator jointly perform pulse position modulation and pulse amplitude modulation, respectively, within one impulse symbol period. Alternatively, the pulse position modulator, the pulse amplitude modulator, and the phase shift keying modulator jointly perform pulse position modulation, pulse amplitude modulation, and phase shift keying modulation, respectively, within one impulse symbol period.

In some aspects of the disclosed technology, the pulse position modulator and the pulse amplitude modulator simultaneously perform pulse position modulation and pulse amplitude modulation, respectively, within one impulse symbol period. Alternatively, the pulse position modulator, the pulse amplitude modulator, and the phase shift keying modulator simultaneously perform pulse position modulation, pulse amplitude modulation, and phase shift keying modulation, respectively, within one impulse symbol period.

In some aspects of the disclosed technology, the transmitter includes a system clock, and the data distributor is configured to distribute the input digital data along the first modulation path and the second modulation path after being synchronized with the system clock. Alternatively, the data distributor is configured to distribute the input digital data along the first modulation path, the second modulation path, and the third modulation path after being synchronized with the system clock.

In some aspects of the disclosed technology, the transmitter includes an oscillator, for example an injection-locked ring oscillator, configured to generate a carrier signal, and further to generate phases for the phase shift keying modulator based on the phase information data.

In some aspects of the disclosed technology, the oscillator is configured to generate the carrier signal with a frequency higher than a frequency of the system clock.

In some aspects of the disclosed technology, the transmitter includes a pulse generator configured to generate a unit pulse from the system clock to trigger the beginning of an impulse symbol.

In some aspects of the disclosed technology, the transmitter includes a control circuit configured to define a duty cycle for the unit pulse based on the time information data, to modulate a delay of the unit pulse based on the time information data, and to set the phase of carrier signal at the beginning of the impulse symbol based on the phase information data.

According to a third aspect of the disclosed technology, a method is provided for generating an impulse for impulse radio transmission signals. The method includes the step of distributing input digital data or bit-stream according to phase information data or bits and time information data or bits along a first modulation path and a second modulation path, respectively. The method further includes the step of performing phase shift keying modulation based on the phase information data along the first modulation path to define a phase of carrier signal of the impulse.

The method further includes the step of performing pulse position modulation based on the time information data along the second modulation path to define a timing position of the impulse. Advantageously, a hybrid impulse modulation technique is provided to combine M-PSK with M-PPM that significantly improves the available data rate for a given modulation order or bits per symbol.

Advantageously, the method further includes the steps of distributing the input digital data according to at least one additional amplitude information data or bits along at least a third modulation path, and performing pulse amplitude modulation based on the amplitude information data along the third modulation path to define an envelope of the impulse. Therefore, an alternative hybrid impulse modulation technique is provided to combine M-PSK, M-PPM, and M-PAM that significantly improves the available data rate for a given modulation order or bits per symbol.

According to a fourth aspect of the disclosed technology, an impulse-radio ultra-wideband transmitter is provided. The transmitter includes a data distributor, a first modulation path, and a second modulation path. In this regard, the data distributor is configured to distribute input digital data according to phase information data and time information data along the first modulation path and the second modulation path, respectively.

In addition, the first modulation path includes a phase shift keying modulator configured to perform phase shift keying modulation based on the phase information data to define a phase of carrier signal of the impulse. Furthermore, the second modulation path includes a pulse position modulator configured to perform pulse position modulation based on the time information data to define a timing position of the impulse.

In some aspects of the disclosed technology, the transmitter includes at least a third modulation path. In this regard, the data distributor is configured to distribute the input digital data according to at least one additional amplitude information data along the third modulation path. Moreover, the third modulation path includes a pulse amplitude modulator configured to perform pulse amplitude modulation based on the amplitude information data to define an envelope of the impulse.

According to a fifth aspect of the disclosed technology, an imaging probe, for example an implantable imaging probe, is provided for in-body and/or out-of-body imaging. The imaging probe includes an impulse-radio ultra-wideband transmitter according to the second aspect and/or the fourth aspect of the disclosed technology, and an interface module or unit operably coupled to the impulse-radio ultra-wideband transmitter. The interface module is configured to provide input data to be modulated to the impulse-radio ultra-wideband transmitter, where the impulse-radio ultra-wideband transmitter is configured to communicate with at least one impulse-radio ultra-wideband receiver, especially via wireless telemetry. In this regard, the imaging probe includes a high channel count, for example greater than 100 channels.

It is to be noted that the transmitter according to the second aspect corresponds to the method according to the first aspect and its implementation forms. The transmitter of the second aspect achieves the same or similar advantages and effects as the method of the first aspect and its respective implementation forms. Moreover, the transmitter according to the fourth aspect corresponds to the method according to the third aspect and its implementation forms. The transmitter of the fourth aspect achieves the same or similar advantages and effects as the method of third aspect and its respective implementation forms.

BRIEF DESCRIPTION OF THE DRAWINGS

The above, as well as additional objects, features, and advantages of the disclosed technology, will be better understood through the following illustrative and non-limiting detailed description, with reference to the appended drawings.

DETAILED DESCRIPTION OF CERTAIN ILLUSTRATIVE EMBODIMENTS

Reference will now be made in detail to embodiments of the present disclosed technology, examples of which are illustrated in the accompanying drawings. However, the following embodiments of the disclosed technology may be variously modified and the range of the disclosed technology is not limited by the following embodiments. Reference signs for similar entities in different embodiments are partially omitted.

Figure 1:
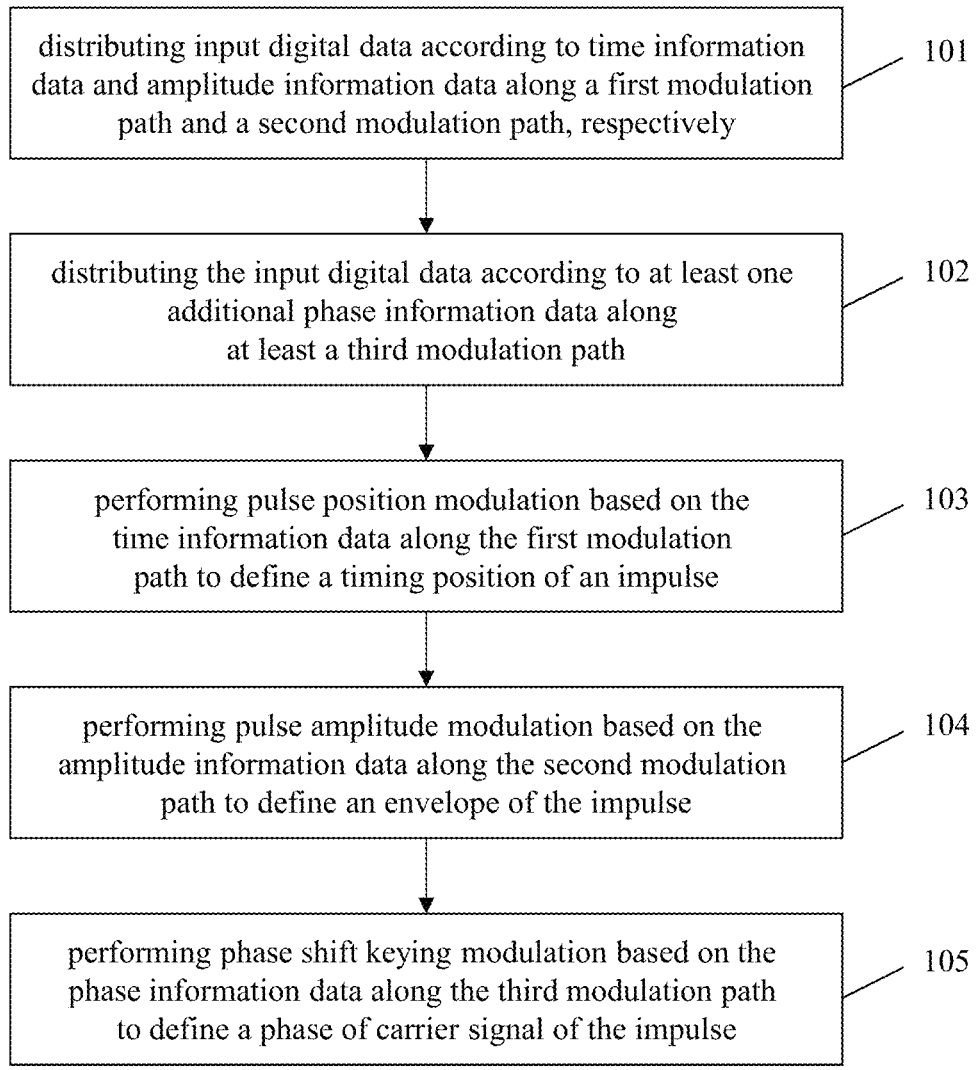
FIG. 1 shows an exemplary embodiment of the method according to the first aspect of the disclosed technology.

FIG. 1 illustrates an exemplary embodiment of a method 100 according to the first aspect of the disclosed technology. In a first step 101, input digital data are distributed according to time information data and amplitude information data along a first modulation path and a second modulation path, respectively. In a second step 102, the input digital data are further distributed according to at least one additional phase information data along at least a third modulation path.

In a third step 103, pulse position modulation is performed based on the time information data along the first modulation path to define a timing position of the impulse. In a fourth step 104, pulse amplitude modulation is performed based on the amplitude information data along the second modulation path to define an envelope of the impulse. Finally, in a fifth step 105, phase shift keying modulation is performed based on the phase information data along the third modulation path to define a phase of carrier signal of the impulse.

It is to be noted that the method 100 may only carry out the steps 101, 103, and 104 to perform PPM and PAM simultaneously and/or jointly, especially within one impulse symbol period. Alternatively, the method 100 may carry out the steps 101-105 to perform PPM, PAM, and PSK modulations simultaneously and/or jointly, especially within one impulse symbol period.

Figure 2:
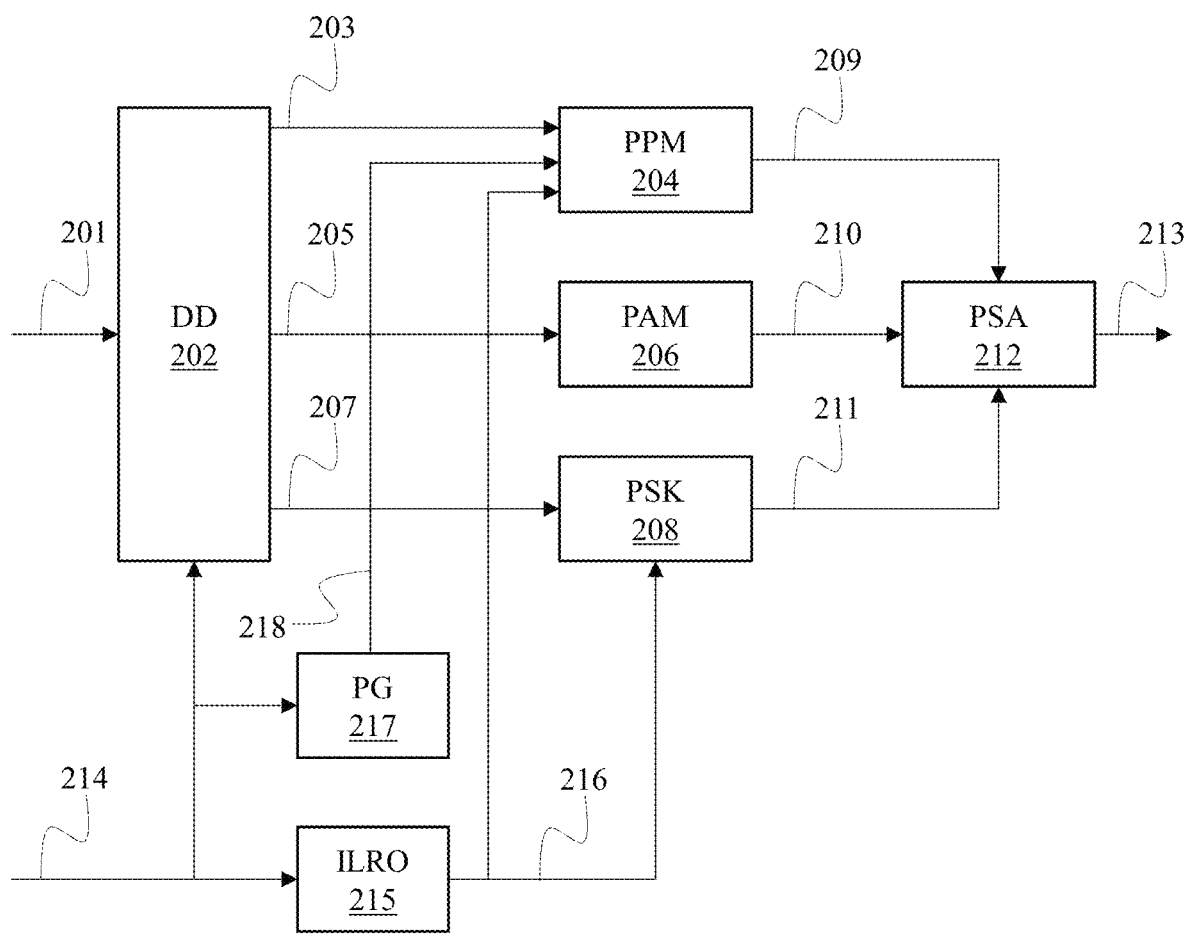
FIG. 2 shows an exemplary embodiment of the transmitter according to the second aspect of the disclosed technology.

FIG. 2 illustrates an exemplary embodiment of a transmitter 200 according to the second aspect of the disclosed technology.

The transmitter 200 includes means (not shown in FIG. 2) for inputting input digital data or burst data or input bitstream 201, and for inputting clock signal 214, where the latter is, in one example, utilized by the transmitter 200 as the system clock. The transmitter 200 further includes a data distributor (DD) 202 configured to distribute the input digital data 201 according to time information data 203, amplitude information data 205, and phase information data 207 along a first modulation path, a second modulation path, and a third modulation path, respectively.

In this regard, the first modulation path may be regarded as pulse position modulation (PPM) path, the second modulation path may be regarded as pulse amplitude modulation (PAM) path, and the third modulation path may be regarded as phase shift keying (PSK) modulation path.

Further, the distribution of the input digital data 201 may be carried out by selecting a defined number of bits from the input digital data 201, either directing from the most significant bit (MSB) or directing from the least significant bit (LSB), corresponding to a defined modulation order or a defined number of bits per symbol for the PPM, PAM, and PSK modulations.

For instance, the DD 202 may include a serial-to-parallel data converter and a synchronization circuit. In this regard, the DD 202 may distribute the input digital data 201, especially by performing serial-to-parallel data conversion and further by synchronizing the parallel data in time with the system clock 214. As such, the distribution of the input digital data 201 can be along the PPM, PAM, and PSK modulation paths after being time-synchronized with the system clock 214.

Accordingly, and in order to generate a transmit impulse to be transmitted by the transmitter 200, the PPM path includes a pulse position modulator (PPM) 204 that performs pulse position modulation based on the time information data 203 to define a timing position of the impulse. Additionally, the PAM path includes a pulse amplitude modulator (PAM) 206 that performs pulse amplitude modulation based on the amplitude information data 205 to define an envelope of the impulse.

Furthermore, the PSK modulation path includes a phase shift keying modulator (PSK) 208 that performs phase shift keying modulation based on the phase information data 207 to define a phase of carrier signal of the impulse. Moreover, the transmitter 200 includes an injection-locked ring oscillator (ILRO) 215 that generates the carrier signal 216, where the injection mechanism is based on the system clock 214.

The transmitter 200 further includes a pulse generator (PG) 217 that generates a unit pulse 218, especially a duty-cycled pulse from the system clock 214, and utilizes the unit pulse 218 as a trigger to set the carrier phase at the beginning of each impulse symbol. This effectively eliminates inter-modulation between PPM and PSK, which will be discussed later in detail.

The transmitter further includes a pulse shaping and amplification unit (PSA) 212 that performs pulse shaping and amplitude control of the generated impulse 213. The PSA 212 may include a pulse-shaping unit and a digitally-controlled power amplifier. The pulse-shaping unit may be implemented with delay cells to form a finite impulse response (FIR) filter to synthesize the impulse shape, for example a triangular-shaped impulse, with the aid of the amplitude control on each FIR tap by the digitally-controlled power amplifier.

In this regard, the digitally-controlled power amplifier may be implemented with a plurality of switched-capacitor amplifiers, each of which forms a unit cell operating on the respective FIR taps of the pulse-shaping unit. The number of unit cells that can be implemented can be based on the modulation order of the PAM 206.

In one non-limiting example, the PPM 204 modulates the delay of the unit pulse 218 according to the time information data 203 and its output 209 is fed to the PSA 212, especially to the pulse-shaping unit, to synthesize the shape of the impulse. The PAM 206 extracts amplitude information for PAM based on the amplitude information data 205 and its output 210 is fed to the PSA 212, especially to each of the amplifier of the respective unit cells, to perform amplitude control of the impulse envelope.

Further, the PSK 208 generates phases of the carrier for the impulse based on the phase information data 207 and its output 211 is fed to the PSA 212, especially to each of the amplifier of the respective unit cells, to define the phase of the carrier of the impulse. In this regard, the PSK 208 may include a phase multiplexer that utilizes the carrier 216 generated by the ILRO 215 and accordingly performs phase selection based on the phase information data 207.

As such, the first modulation path or the PPM path may include the PPM 204, and optionally the PG 217 and PSA 212. The second modulation path or the PAM path may include the PAM 206 and optionally the PSA 212. The third modulation path or the PSK path may include the PSK 208 and optionally the PSA 212.

The transmitter may further include output means to transmit the generated impulse 213. The output means may include an antenna port and a matched network and/or balun, and optionally an antenna, for example an RF antenna. The output means may include a driver circuit and at least a light emitting diode, where the driver circuit drives the light emitting diode by the generated impulse 213 to transmit the data in the form of light, for example IR or UV.

Figure 3:
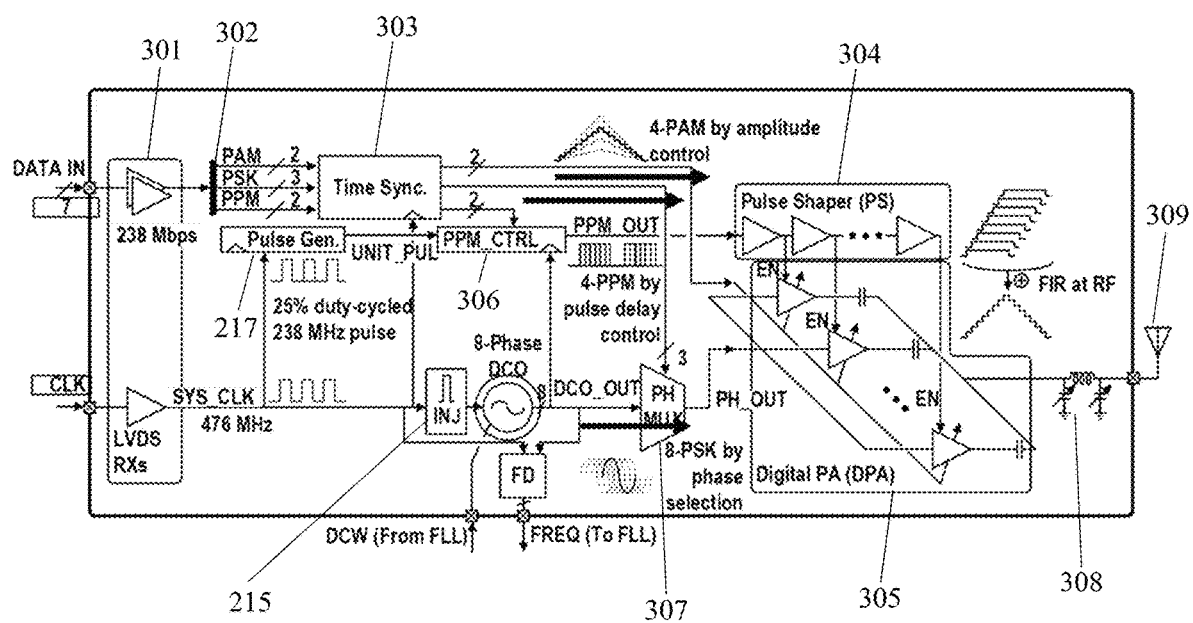
FIG. 3 shows the functional blocks and an exemplary operation of the transmitter in detail.

FIG. 3 illustrates an embodiment of a transmitter 300 where an exemplary operation is shown in detail. The transmitter 300 is illustrated as a digital polar IR-UWB transmitter on chip. The transmitter 300 includes a low voltage differential signaling receiver (LVDS-RX) 301 that inputs the digital input data DATA IN and the clock signal CLK. The digital input data DATA IN is depicted as 7-bit 238 Mbps data, that is, a burst of 7-bit of information for each impulse symbol to be generated. The system clock SYS_CLK is depicted as a 476 MHz clock signal.

The serial-to-parallel converter 302 converts the 7-bit input data into parallel data of 2-bit, 3-bit, and 2-bit corresponding to the pulse amplitude modulation, phase shift keying modulation, and pulse position modulation, respectively. In other words, the modulation order for respective PAM, PSK, and PPM is defined as 4 (that is, 4PAM), 8 (that is, 8PSK), and 4 (that is, 4PPM), respectively. Accordingly, the synchronization circuit 303 uses the system clock (SYS_CLK) to time-synchronize the parallel data bits.

The system clock SYS_CLK is further fed to the ILRO 215, especially to generate injection pulses from the clock signal SYS_CLK for the 8 phases of the oscillator corresponding to 8PSK modulation. The ILRO 215 can be implemented with a frequency locked loop (FLL), either implemented externally or on the transmitter chip, that locks on the reference frequency provided by the system clock SYS_CLK.

Accordingly, the desired frequency FD is provided to the FLL from the oscillator and the control word from the FLL is fed to the oscillator to achieve a stable DCO frequency. The phase multiplexer or phase selector 307 is then able to perform 8PSK by selecting one of the 8 phases from the ILRO 215.

Further, the pulse generator (PG) 217 generates a 25% duty-cycled unit pulse UNIT_PUL at 238 MHz from the system clock SYS_CLK. A control circuit 306 is provided, for example within the PPM 204, that modulates the delay of the unit pulse UNIT_PUL according to the modulation order for PPM (that is, 4PPM), and its output PPM_OUT is fed to the pulse shaper 304 to synthesize a triangular-shaped impulse, with the aid of the digitally-controlled power amplifier (DPA) 305. The DPA 305 further uses the PAM data (that is, 4PAM) to perform amplitude control, and the output PH_OUT of the phase multiplexer 307 to select the phase of the carrier of the impulse.

The transmitter 300 is further provided with a matched network or balun 308, herein illustrated as a lumped circuit, followed by an antenna 309, in order to transmit the generated impulse. The antenna 309 may not be included within the transmitter chip. Alternately, the antenna 309 is realized with micro-electromechanical system (MEMS) technology, that is, an RF-MEMS antenna, and is incorporated with the transmitter chip.

Figure 4:
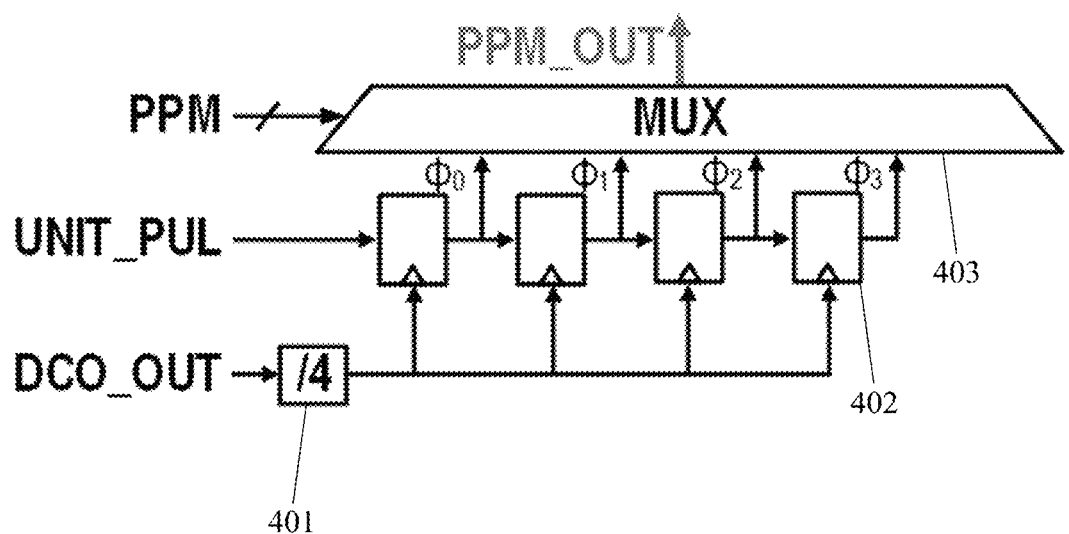
FIG. 4 shows an exemplary embodiment of the control circuit for pulse position modulation.
Figure 4:
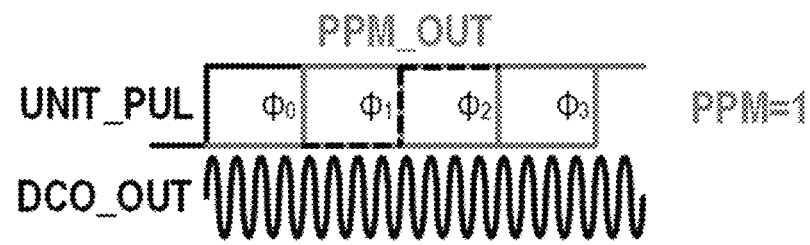

FIG. 4 illustrates an exemplary embodiment of the control circuit 306 for pulse position modulation. The control circuit 306 includes a frequency divider that divides the carrier, that is, the output DCO_OUT of the ILRO 215, to modulate the delay of the unit pulse UNIT_PUL by means of a delay circuit 402 comprising a plurality of delay elements. The number of delay elements, that is, the number of positions for the pulses in time, is defined by the modulation order of the PMM. The output from each of the delay taps, $\varphi_0$, $\varphi_1$, $\varphi_2$, and $\varphi_4$, are fed to a multiplexer 403 from which the respective positions in time are selected based on the PPM data. In the bottom of FIG. 4, the timing relationship between the DCO_OUT, UNIT_PUL, and the PPM_OUT is shown. Here, the PPM data is selected as decimal 1.

It is to be noted that the carrier signal at the DCO_OUT, especially in terms of frequency, is much higher than the SYS_CLK. This, together with the ease of adding delay elements to the delay circuit 402 (for example by means of the division factor of the DCO_OUT), allows to control the pulse position with much finer steps allowing for a high modulation order PPM. Moreover, the implementation with the delay chain is also easily scalable. In this regard, the DCO frequency may be targeted to 6 to 9 GHz, that is, the high band of UWB. In order to facilitate the multiple delay stages for M-PSK, a negative skewing technique may be adopted for reducing the delay of each stage.

Figure 5:
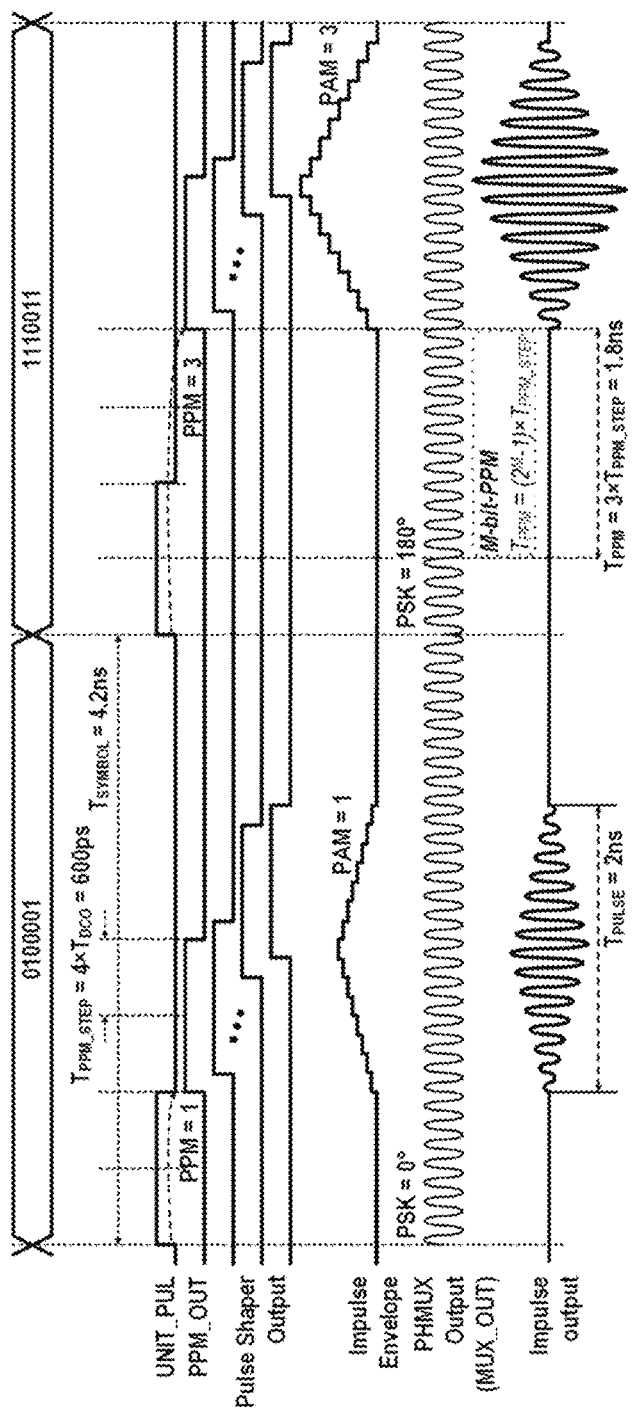
FIG. 5 shows an exemplary timing diagram for the transmitter operation of FIG. 3.

FIG. 5 illustrates a timing diagram for the exemplary operation of the transmitter 300. A first input data bit stream 0100001 is exemplary presented as a burst data for a first impulse period. From MSB to LSB, two bits (01) are defined as PAM data, three bits (000) are defined as PSK data, and two bits (01) are defined as PPM data. The selection of the number of bits is determined based on the respective modulation order. However, the respective direction of assignment can be arbitrarily determined, for example from LSB to MSB and/or with different assignment as PPM, PAM, and PSK data.

The unit pulse UNIT_PUL triggers the start of the first impulse period. As described with reference to FIG. 4, the UNIT_PUL is delayed according to the PPM data (decimal 1 as shown here) to generate PPM_OUT, which is fed to the pulse shaper 304 to synthesize a triangular-shaped impulse. The envelope of the impulse is controlled, that is, amplitude controlled, using the PAM data (decimal 1 as shown here). On the other hand, the carrier phase is set at the beginning of the first impulse period by the phase multiplexer 307 based on the PSK data (0 degree as shown here).

A second input data bit stream 1110011 is exemplary presented as a burst data for a second impulse period. From MSB to LSB, two bits (11) are defined as PAM data, three bits (100) are defined as PSK data, and two bits (11) are defined as PPM data. The selection of the number of bits is determined based on the respective modulation order. However, the respective direction of assignment can be arbitrarily determined, for example from LSB to MSB and/or with different assignment as PPM, PAM, and PSK data.

The unit pulse UNIT_PUL triggers the start of the second impulse period. As described with reference to FIG. 4, the UNIT_PUL is delayed according to the PPM data (decimal 3 as shown here) to generate PPM_OUT, which is fed to the pulse shaper 304 to synthesize a triangular-shaped impulse. The envelope of the impulse is controlled, that is, amplitude controlled, using the PAM data (decimal 3 as shown here). On the other hand, the carrier phase is set at the beginning of the second impulse period by the phase multiplexer 307 based on the PSK data (180 degrees as shown here).

The generated impulse output is therefore conveying information in its envelope (amplitude), its carrier phase, and its position in time. As such, the proposed modulation scheme depicts a hybrid impulse modulation scheme that employs an agile digital polar-based IR-UWB transmitter to combine 4PAM, 8PSK, and 4PPM within one impulse symbol period. The pulse width of the impulse ($T_{PULSE}$) is set to about 2 ns by the pulse shaper, and the symbol period ($T_{SYMBOL}$) is set by two cycles of the system clock SYS_CLK to be 4.2 ns.

This ensures a sufficient time range ($T_{PPM}$) to perform 4PPM and avoids potential impact from inter-symbol interference or multi-path. The PPM time step ($T_{PPM\_STEP}$) of 600 ps is chosen according to a target Eb/N0 requirement, which will be described later, and the PPM control complexity. The delay step ($T_{DCO}$) is the quarter period of DCO_OUT, and as long as the oscillator DCO is injection locked by the SYS_CLK, no extra delay calibration is required.

Figure 6:
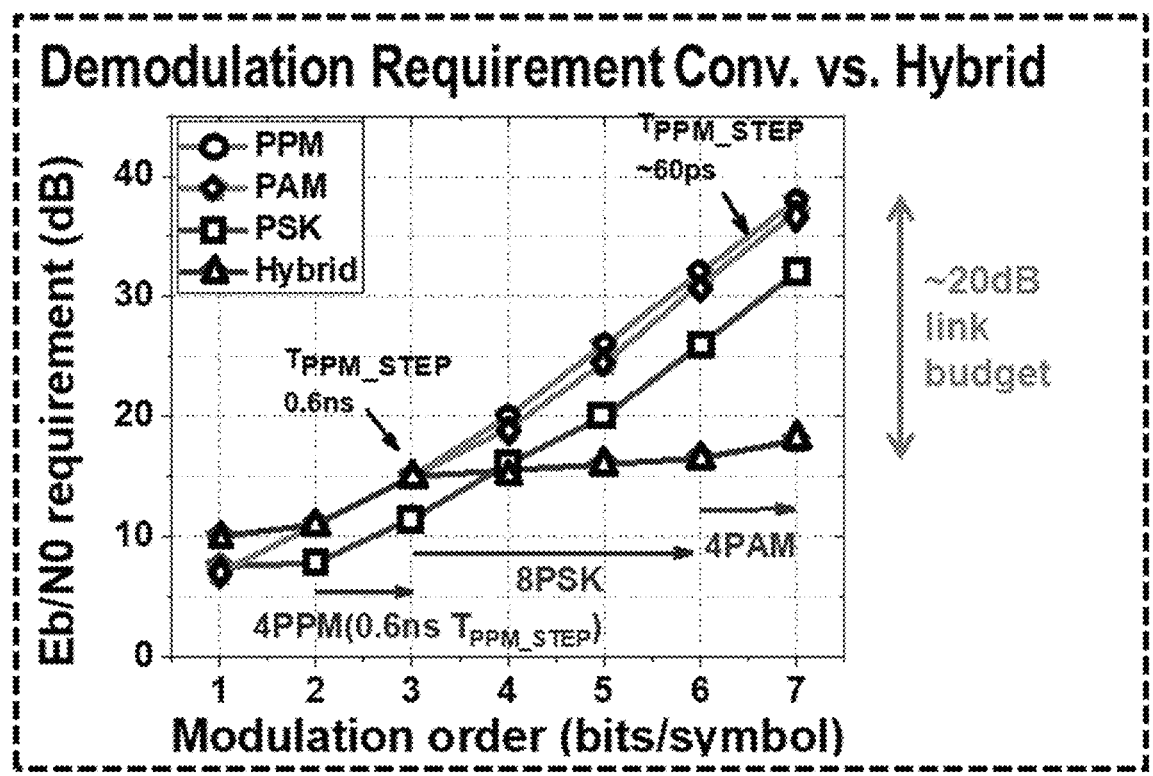
FIG. 6 shows demodulation requirements for various modulation types.

FIG. 6 illustrates demodulation requirements for different conventional modulation types with respect to the presented modulation scheme. The horizontal axis denotes the modulation order (bits/symbol) and the vertical axis denotes the Eb/N0 requirement in decibel (dB). The line with circular points denotes conventional PPM, the line with diamond points denotes conventional PAM, the line with square points denotes conventional PSK, and the line with triangular points denotes the proposed hybrid modulation.

It can be seen that the conventional PPM with 7 bits per symbol has an Eb/N0 requirement of about 40 dB. Instead of increasing modulation order by reducing the time step of M-PPM, the proposed modulation technique uses a hybrid modulation scheme that combines 4PAM, 8PSK, and 4PPM within one symbol period. This achieves a high data rate with 7 bits per symbol while significantly reducing the Eb/N0 requirement by about 20 dB compared to the conventional M-PPM.

Figure 7:
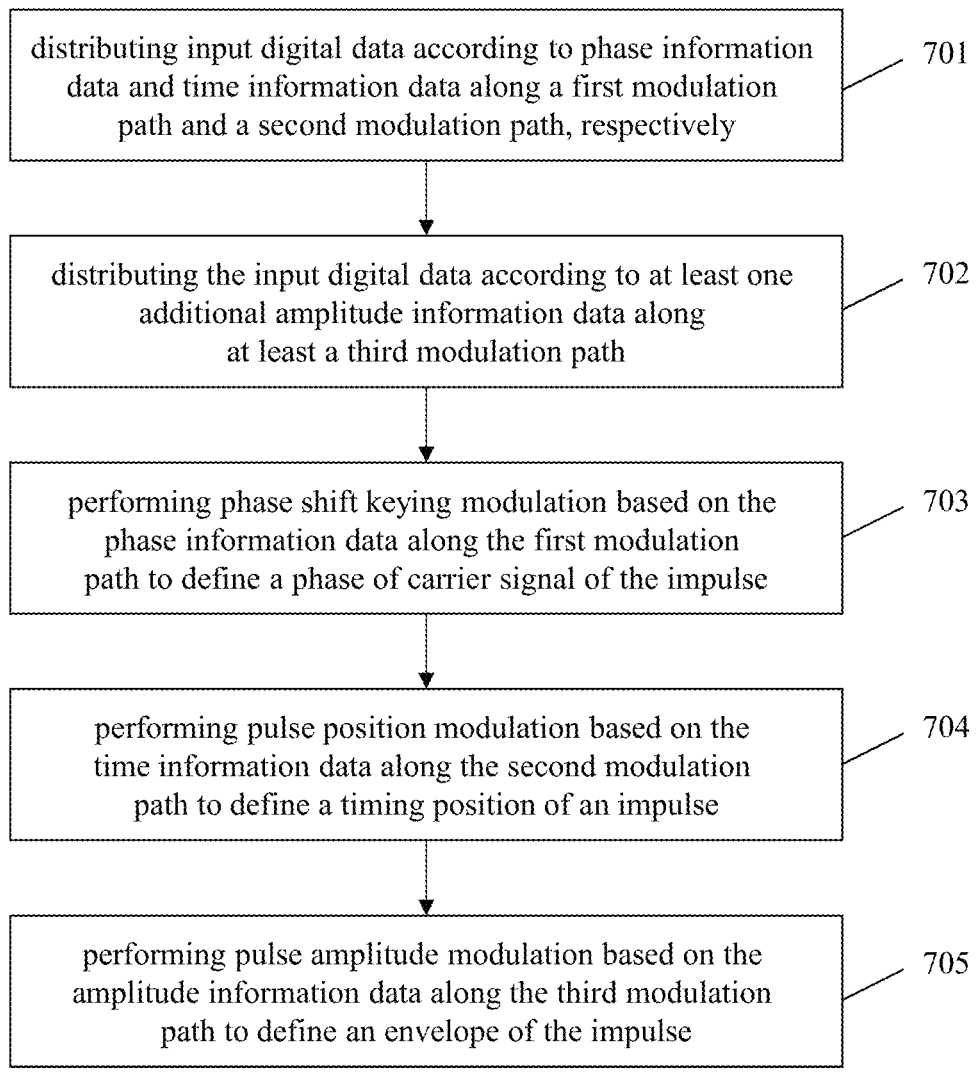
FIG. 7 shows an exemplary embodiment of the method according to the third aspect of the disclosed technology.

FIG. 7 illustrates an exemplary embodiment of a method 700 according to the third aspect of the disclosed technology. In a first step 701, input digital data are distributed according to phase information data and time information data along a first modulation path and a second modulation path, respectively. In a second step 702, the input digital data are further distributed according to at least one additional amplitude information data along at least a third modulation path.

In a third step 703, phase shift keying modulation is performed based on the phase information data along the first modulation path to define a phase of carrier signal of the impulse. In a fourth step 704, pulse position modulation is performed based on the time information data along the second modulation path to define a timing position of the impulse. Finally, in a fifth step 705, pulse amplitude modulation is performed based on the amplitude information data along the third modulation path to define an envelope of the impulse.

It is to be noted that the method 700 may only carry out the steps 701, 703, and 704 to perform PSK and PPM simultaneously and/or jointly, especially within one impulse symbol period. Alternatively, the method 700 may carry out the steps 701-705 to perform PSK, PPM, and PAM modulations simultaneously and/or jointly, especially within one impulse symbol period.

Figure 8:
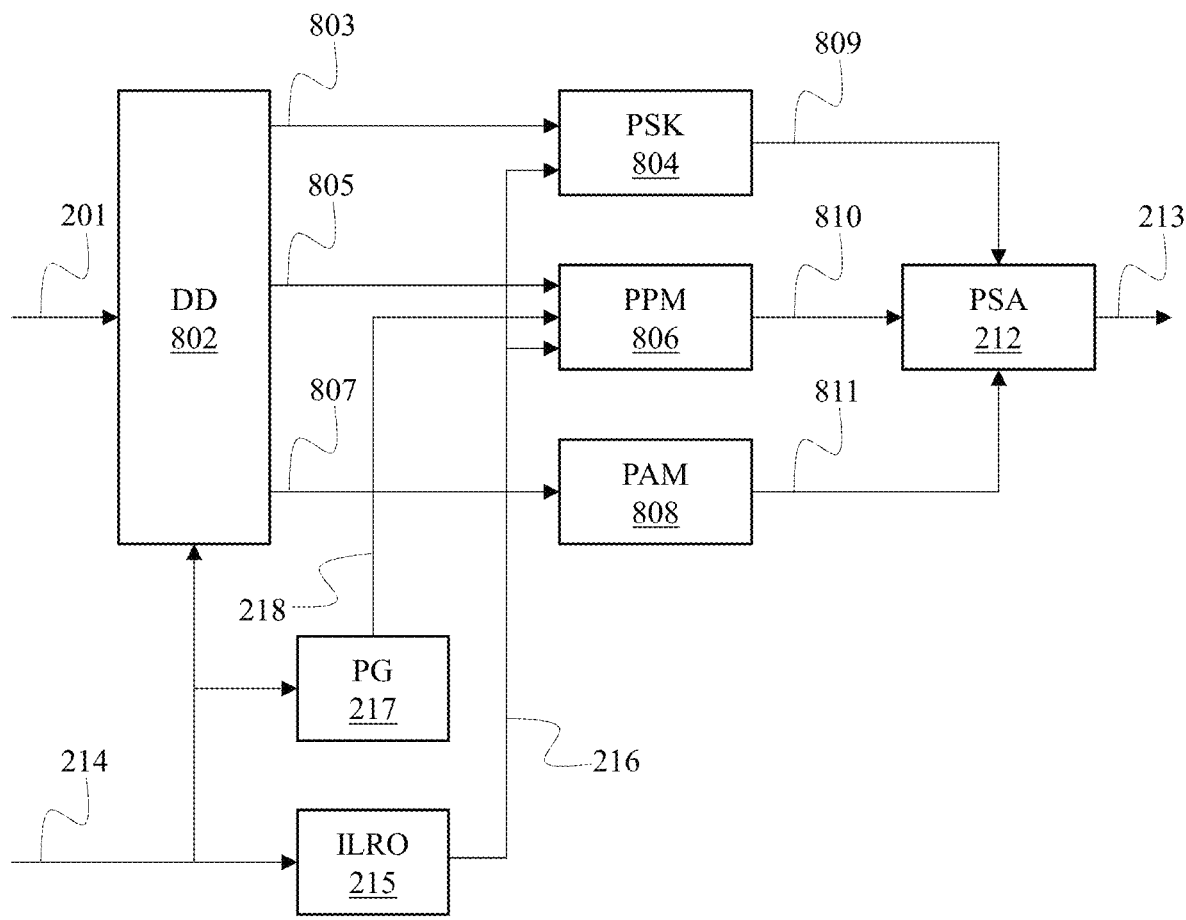
FIG. 8 shows an exemplary embodiment of the transmitter according to the fourth aspect of the disclosed technology.

FIG. 8 illustrates an exemplary embodiment of a transmitter 800 according to the fourth aspect of the disclosed technology.

The transmitter 800 includes means (not shown) for inputting input digital data or burst data or input bit-stream 201, and for inputting clock signal 214, where the latter can be utilized by the transmitter 800 as the system clock. The transmitter 800 further includes a data distributor (DD) 802 configured to distribute the input digital data 201 according to phase information data 803, time information data 805, and amplitude information data 807 along a first modulation path, a second modulation path, and a third modulation path, respectively.

In this regard, the first modulation path may be regarded as phase shift keying (PSK) modulation path, the second modulation path may be regarded as pulse position modulation (PPM) path, and the third modulation path may be regarded as pulse amplitude modulation (PAM) path.

Further, the distribution of the input digital data 201 may be carried out by selecting a defined number of bits from the input digital data 201, either directing from the most significant bit (MSB) or directing from the least significant bit (LSB), corresponding to a defined modulation order or a defined number of bits per symbol for the PSK, PPM, and PAM modulations.

For instance, the DD 802 may include a serial-to-parallel data converter and a synchronization circuit. In this regard, the DD 802 may distribute the input digital data 201, especially by performing serial-to-parallel data conversion and further by synchronizing the parallel data in time with the system clock 214. As such, the distribution of the input digital data 201 can be along the PSK, PPM, and PAM modulation paths after being time-synchronized with the system clock 214.

Accordingly, and in order to generate a transmit impulse to be transmitted by the transmitter 800, the PSK modulation path includes a phase shift keying modulator (PSK) 804 that performs phase shift keying modulation based on the phase information data 803 to define a phase of carrier signal of the impulse. Additionally, the PPM path includes a pulse position modulator (PPM) 806 that performs pulse position modulation based on the time information data 805 to define a timing position of the impulse.

Furthermore, the PAM path includes a pulse amplitude modulator (PAM) 808 that performs pulse amplitude modulation based on the amplitude information data 807 to define an envelope of the impulse. Moreover, the transmitter 800 includes an injection-locked ring oscillator (ILRO) 215 that generates the carrier signal 216, where the injection mechanism is based on the system clock 214.

The transmitter 800 further includes a pulse generator (PG) 217 that generates a unit pulse 218, especially a duty-cycled pulse from the system clock 214, and utilizes the unit pulse 218 as a trigger to set the carrier phase at the beginning of each impulse symbol. This effectively eliminates inter-modulation between PPM and PSK as described with reference to FIG. 4.

The transmitter further includes a pulse shaping and amplification unit (PSA) 212 that performs pulse shaping and amplitude control of the generated impulse 213. The PSA 212 may correspond to the PSA of FIG. 2 and its operation described therein.

The PSK 804 can generate phases of the carrier for the impulse based on the phase information data 803, and its output 809 is fed to the PSA 212, especially to each of the amplifier of the respective unit cells, to define the phase of the carrier of the impulse. In this regard, the PSK 804 may include a phase multiplexer that utilizes the carrier 216 generated by the ILRO 215 and accordingly performs phase selection based on the phase information data 803.

Further, the PPM 806 modulates the delay of the unit pulse 218 according to the time information data 805 and its output 810 is fed to the PSA 212, especially to the pulse-shaping unit, to synthesize the shape of the impulse. Moreover, the PAM 808 extracts amplitude information for PAM based on the amplitude information data 807 and its output 811 is fed to the PSA 212, especially to each of the amplifier of the respective unit cells, to perform amplitude control of the impulse envelope.

As such, the PSK path may include the PSK 804 and optionally the PSA 212. The PPM path may include the PPM 806, and optionally the PG 217 and PSA 212. The PAM path may include the PAM 808 and optionally the PSA 212.

The transmitter 800 may further include output means to transmit the generated impulse 213. The output means may include an antenna port and a matched network and/or balun, and optionally an antenna, for example an RF antenna. The output means may include a driver circuit and at least a light emitting diode, where the driver circuit drives the light emitting diode by the generated impulse 213 to transmit the data in the form of light, for example IR or UV.

It is to be noted that the DD, the ILRO, the PG, and the PSA of the transmitter 800 correspond to the DD, the ILRO, the PG, and the PSA, respectively, of the transmitters 200 and 300. As such, the structural and operational details of the DD, the ILRO, the PG, and the PSA, as described with reference to FIG. 2 and FIG. 3, are analogously applicable for the DD, the ILRO, the PG, and the PSA, respectively, of the transmitter 800.

Figure 9:
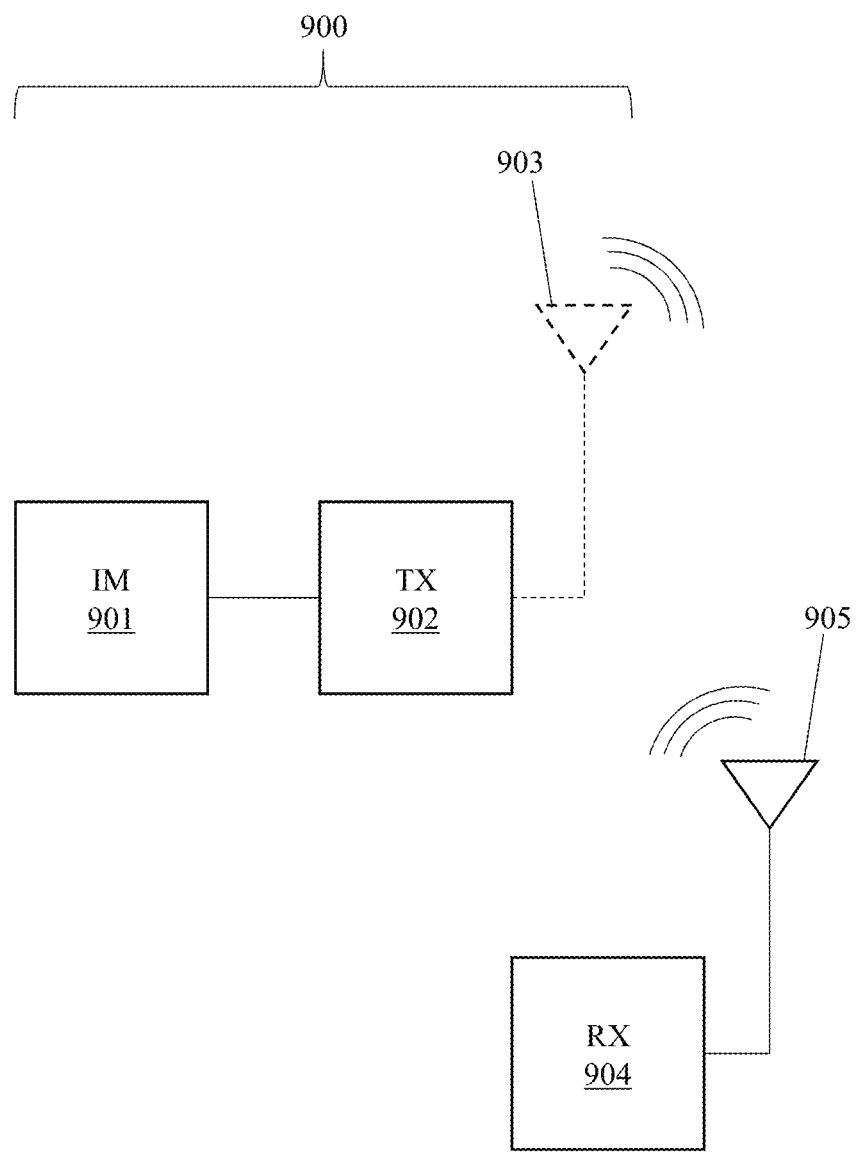
FIG. 9 shows an exemplary embodiment of the imaging probe according to the fifth aspect of the disclosed technology and an exemplary wireless telemetry scheme.

FIG. 9 illustrates an exemplary embodiment of an imaging probe 900 according to the fifth aspect of the disclosed technology. FIG. 9 further shows an exemplary wireless telemetry scheme between the imaging probe 900 and an impulse-radio ultra-sideband receiver (RX) 904.

The imaging probe 900 includes an interface module (IM) 901 or unit and an impulse-radio ultra-wideband transmitter (TX) 902, where the IM 901 is operably coupled to the TX 902. The TX 902 corresponds to the transmitters 200, 300, and 800, and may include an antenna as described for them, for example the antenna 309 (such as a MEMS antenna). However, if the TX 902 does not include the antenna, the imaging probe may additionally include an antenna 903, for example a MEMS antenna, in order to communicate with the RX 904, especially via an antenna 905 of the RX 904. The communication between the antenna 903 and the antenna 905 is a form of wireless communication, for instance, RF, IR, UV, and the like.

The IM 901 may provide the input data 201 to the TX 902, where the TX 903 may perform the subsequent modulations as discussed along the transmitters 200, 300, and 800, and may communicate with the RX 904, especially via wireless telemetry, in order to transmit the generated impulse 213.

As such, one practical aspect of the proposed disclosed technology is to achieve a high-speed transcutaneous wireless transmitter for high-channel count neural sensing. Intracortical extracellular neural sensing is being rapidly and widely applied in several clinical research and brain-computer interfaces (BCIs), as the number of sensing channels continues to double every 6 years. By distributing multiple high-density extracellular micro-electrode arrays (MEAs) in-vivo across the brain, each with hundreds of sensing channels, neuroscientists have begun to map the correlation of neuronal activity across different brain regions, with the single-neuron precision.

Since each neural sensing channel typically samples at 20-50 kSps with a >10 b ADC, multiple MEAs demand a data transfer rate up to Gbps. However, these BCIs are severely hindered in many clinical uses due to the lack of a high-data-rate and miniature wireless telemetry solution that can be implanted below the scalp, for example transcutaneously. The area of the wireless telemetry module should be miniaturized to ~3 cm$^2$ due to anatomical and neurosurgical implantation constraints.

Further, the transmission range up to 10 cm is highly desirable, in order to improve the reliability of the wireless link against, for example, antenna misalignment. Finally, the power consumption of the wireless telemetry should be limited to ~10 mW to minimize thermal flux from the module's surface area, avoiding excessive tissue heating.

Most of the conventional transcutaneous wireless telemetry adopts inductive coupling, but the data rate is limited to a few Mbps. The state-of-the-art IR-UWB transmitter achieves 1.125 Gbps data rate by adopting digitalized multi-pulse-position-modulation (D-MPPM) with a fine time step of ~60 ps. However, based on Euclidean distance, high Eb/NO is required to discriminate two adjacent PPM positions. This is not feasible in the targeted implant scenarios where the miniature antenna and tissue at UWB frequency can introduce up to 60 dB of path loss.

In addition, the non-linearity and the sensitivity to the PVT variations of the digital-to-time converter required for D-PPM introduces bit errors, requiring complex calibrations. Alternatively, higher data rate can be achieved with a shorter impulse, but this requires a larger antenna, due to Q-factor and area trade-off.

Embodiments of the proposed transmitter according to the disclosed technology may be utilized as a transcutaneous IR-UWB transmitter with a record high data rate, while achieving up to 10 times longer transmission range and with performance well within the volumetric and heat dissipation constraints. Particularly, the proposed hybrid multi-level impulse modulation including M-PPM, M-PSK, and M-PAM, and the low-power calibration free delay generator for calibration free M-PPM, result in the synergistic effect of achieving higher data rate while being able to transmit up to 10 cm of distance.

It is important to note that the word "comprising" does not exclude other elements or steps and the indefinite article "a" or "an" does not exclude a plurality. A single element or other unit may fulfill the functions of several entities or items recited in the claims. Moreover, the description with regard to any of the aspects is also relevant with regard to the other aspects of the disclosed technology.

Although the disclosed technology has been illustrated and described with respect to one or more implementations, equivalent alterations and modifications will occur to others skilled in the art upon the reading and understanding of this specification and the annexed drawings. In addition, while a particular feature of the disclosed technology may have been disclosed with respect to only one of several implementations, such feature may be combined with one or more other features of the other implementations as may be desired and advantageous for any given or particular application.

What is claimed is:

1. A method of generating an impulse for impulse radio transmission signals, the method comprising:
   distributing input digital data according to time information data and amplitude information data along a first modulation path and a second modulation path, respectively;
   performing pulse position modulation based on the time information data along the first modulation path to define a timing position of the impulse; and
   performing pulse amplitude modulation based on the amplitude information data along the second modulation path to define an envelope of the impulse.

2. The method according to claim 1, further comprising:
   distributing the input digital data according to at least one additional phase information data along at least a third modulation path; and
   performing phase shift keying modulation based on the phase information data along the third modulation path to define a phase of a carrier signal of the impulse.

3. The method according to claim 2, wherein at least one of the pulse position modulation, the pulse amplitude modulation, and the phase shift keying modulation has a modulation order higher than binary.

4. The method according to claim 2, further comprising:
   performing the pulse position modulation and the pulse amplitude modulation jointly within one impulse symbol period; or
   performing the pulse position modulation, the pulse amplitude modulation, and the phase shift keying modulation jointly within one impulse symbol period.

5. The method according to claim 2, further comprising:
   distributing the input digital data along the first modulation path and the second modulation path after being synchronized with a system clock; or
   distributing the input digital data along the first modulation path, the second modulation path, and the third modulation path after being synchronized with a system clock.

6. The method according to claim 1, further comprising:
   generating a unit pulse from a system clock to trigger the beginning of an impulse symbol;
   modulating a delay of the unit pulse based on the time information data; and
   setting a phase of a carrier signal at the beginning of the impulse symbol based on the phase information data.

7. The method according to claim 6, further comprising defining a duty cycle for the unit pulse based on the time information data.

8. An impulse-radio ultra-wideband transmitter comprising:
   a data distributor;
   a first modulation path; and
   a second modulation path,
   wherein the data distributor is configured to distribute input digital data according to time information data and amplitude information data along the first modulation path and the second modulation path, respectively,
   wherein the first modulation path comprises a pulse position modulator configured to perform pulse position modulation based on the time information data to define a timing position of an impulse, and
   wherein the second modulation path comprises a pulse amplitude modulator configured to perform pulse amplitude modulation based on the amplitude information data to define an envelope of the impulse.

9. The transmitter according to claim 8,
wherein the transmitter comprises at least a third modulation path,
wherein the data distributor is configured to distribute the input digital data according to at least one additional phase information data along the third modulation path, and
wherein the third modulation path comprises a phase shift keying modulator configured to perform phase shift keying modulation based on the phase information data to define a phase of a carrier signal of the impulse.

10. The transmitter according to claim 9, wherein at least one of the pulse position modulation, the pulse amplitude modulation, and the phase shift keying modulation has a modulation order higher than binary.

11. The method according to claim 9,
wherein the pulse position modulator and the pulse amplitude modulator jointly perform the pulse position modulation and the pulse amplitude modulation, respectively, within one impulse symbol period, or
wherein the pulse position modulator, the pulse amplitude modulator, and the phase shift keying modulator jointly perform the pulse position modulation, the pulse amplitude modulation, and the phase shift keying modulation, respectively, within one impulse symbol period.

12. The transmitter according to claim 9, wherein the transmitter comprises a system clock, and
wherein the data distributor is configured to distribute the input digital data along the first modulation path and the second modulation path after being synchronized with the system clock, or
wherein the data distributor is configured to distribute the input digital data along the first modulation path, the second modulation path, and the third modulation path after being synchronized with the system clock.

13. The transmitter according to claim 9, wherein the transmitter comprises an injection-locked ring oscillator configured to generate a carrier signal, the oscillator further configured to generate phases for the phase shift keying modulator based on the phase information data.

14. The transmitter according to claim 13, wherein the oscillator is configured to generate the carrier signal with a frequency higher than a frequency of a system clock.

15. The transmitter according to any of claim 8, wherein the transmitter comprises a pulse generator configured to generate a unit pulse from a system clock to trigger the beginning of an impulse symbol.

16. The transmitter according to claim 15, wherein the transmitter comprises a control circuit configured to:
define a duty cycle for the unit pulse based on the time information data;
modulate a delay of the unit pulse based on the time information data; and
set the phase of a carrier signal at the beginning of the impulse symbol based on the phase information data.

17. A method of generating an impulse for impulse radio transmission signals, the method comprising:
distributing input digital data according to phase information data and time information data along a first modulation path and a second modulation path, respectively;
performing phase shift keying modulation based on the phase information data along the first modulation path to define a phase of a carrier signal of the impulse; and
performing pulse position modulation based on the time information data along the second modulation path to define a timing position of the impulse.

18. The method according to claim 17, further comprising:
distributing the input digital data according to at least one additional amplitude information data along at least a third modulation path; and
performing pulse amplitude modulation based on the amplitude information data along the third modulation path to define an envelope of the impulse.

19. An impulse-radio ultra-wideband transmitter comprising:
a data distributor;
a first modulation path; and
a second modulation path,
wherein the data distributor is configured to distribute input digital data according to phase information data and time information data along the first modulation path and the second modulation path, respectively,
wherein the first modulation path comprises a phase shift keying modulator configured to perform phase shift keying modulation based on the phase information data to define a phase of carrier signal of the impulse, and
wherein the second modulation path comprises a pulse position modulator configured to perform pulse position modulation based on the time information data to define a timing position of the impulse.

20. The transmitter according to claim 19,
wherein the transmitter comprises at least a third modulation path,
wherein the data distributor is configured to distribute the input digital data according to at least one additional amplitude information data along the third modulation path, and
wherein the third modulation path comprises a pulse amplitude modulator configured to perform pulse amplitude modulation based on the amplitude information data to define an envelope of the impulse.

* * * * *

UNITED STATES PATENT AND TRADEMARK OFFICE
CERTIFICATE OF CORRECTION

PATENT NO. : 12,021,557 B2  
APPLICATION NO. : 18/160474  
DATED : June 25, 2024  
INVENTOR(S) : Yao-Hong Liu et al.

Page 1 of 1

It is certified that error appears in the above-identified patent and that said Letters Patent is hereby corrected as shown below:

In the Specification

At Column 10, Line 27, delete "($T_{DCO}$))" and insert -- ($T_{DCO}$) --.

At Column 10, Line 41, delete "Eb/NO" and insert -- Eb/N0 --.

At Column 12, Line 45, delete "ultra-sideband" and insert -- ultra-wideband --.

At Column 13, Line 10, delete "10 b" and insert -- 10b --.

At Column 13, Line 36, delete "D-PPM" and insert -- D-MPPM --.

In the Claims

At Column 15, Line 16, in Claim 11, delete "method" and insert -- transmitter --.

At Column 15, Line 44, in Claim 15, delete "any of claim" and insert -- claim --.

Signed and Sealed this  
Thirty-first Day of December, 2024

Derrick Brent  
*Acting Director of the United States Patent and Trademark Office*